United States Patent [19]

Sweet

[11] 3,736,432
[45] May 29, 1973

[54] BACTERIAL COLONY COUNTING METHOD AND APPARATUS

[75] Inventor: Richard G. Sweet, Palo Alto, Calif.
[73] Assignee: Varian Associates, Palo Alto, Calif.
[22] Filed: Mar. 22, 1971
[21] Appl. No.: 126,778

[52] U.S. Cl. ......250/222 PC, 250/218, 235/61.11 E, 195/DIG. 2
[51] Int. Cl. .............................................G06k 7/00
[58] Field of Search ......................250/222 PC, 222, 250/209, 234, 218; 356/244, 201; 235/92 V, 61.11 E; 195/DIG. 2

[56] References Cited

UNITED STATES PATENTS

| 3,493,772 | 2/1970 | Daughters et al. | 356/244 X |
| 2,838,602 | 6/1958 | Sprick | 250/219 CR X |
| 3,206,606 | 9/1965 | Burgo et al. | 250/209 X |
| 2,850,239 | 9/1958 | Polyani et al. | 250/222 PC |

*Primary Examiner*—Walter Stolwein
*Attorney*—Stanley Z. Cole and Leon F. Herbert

[57] ABSTRACT

Light from a localized source is projected through a transparent bacterial culture medium having a multitude of bacterial colonies formed on the surface thereof. The bacterial colonies serve as lenses for focusing images of the light source into a pattern of images which are projected into an image plane forming a pattern of light images corresponding to the pattern of bacterial colonies. A linear array of photodetectors is disposed in the projected image plane. The optical system is scanned relative to the bacterial colony culture such that adjacent scanning tracks overlap each other by approximately the track width of two photodetectors of the array of photodetectors. An output pulse, which is to be counted, from one detector inhibits counting output pulses from its nearest neighbors and the output pulses from the detectors at opposite ends of the array are not counted to form guard detectors, whereby colonies are accurately counted and colonies which overlap adjacent scanning tracks are counted but only once.

7 Claims, 5 Drawing Figures

Patented May 29, 1973

INVENTOR.
RICHARD G. SWEET
BY
Leon F. Herbert
ATTORNEY

INVENTOR.
RICHARD G. SWEET
BY
Leon F. Herbert
ATTORNEY

BACTERIAL COLONY COUNTING METHOD AND APPARATUS

DESCRIPTION OF THE PRIOR ART

Heretofore, bacterial colony counting machines have been proposed in which light from a localized source is transmitted through a culture medium having a plurality of bacterial colonies formed on the surface thereof. The bacterial colonies serve as lenses for focusing images of the localized source into a pattern of images in a plane above the surface of the culture medium. A projection lens was employed for magnifying and focusing the bacterial colony image pattern onto a second image plane in which an array of photodetectors was positioned. Relative movement was then obtained between the culture medium and the optical system for scanning the pattern of light images with the array of photodetectors. Pulse output, obtained by each photodetector encountering a light image, was processed by a nearest neighbor inhibiting circuit such that the output pulse from the detector first to encounter the image was counted and it also blocked counting of the pulse outputs of its nearest neighbors such that each image was counted but only once. The array of photodetectors extended transversely across the entire radial extent of the image pattern such that only one circular scanning path or track over the image pattern was employed to obtain a count of the bacterial colonies. Such a bacterial counting machine and method was disclosed and claimed in U.S. Pat. No. 3,493,772 issued Feb. 3, 1970.

One problem with the aforecited prior art bacterial counting machine is that the machine requires a relatively large number (several hundred) of photodetectors and associated signal processing circuits to span a radius of approximately 4.5 cm, the radius of a typical petri dish in which bacterial colonies to be counted are grown.

Therefore, it is desired to obtain a method and apparatus for counting bacterial colonies on a culture medium which reduces the number of photodetectors and associated circuits.

SUMMARY OF THE PRESENT INVENTION

The principal object of the present invention is the provision of improved method and apparatus for counting bacterial colonies.

In one feature of the present invention, the colonies are counted by means of an array of photodetectors which are repetitively scanned across the pattern of light focused by the bacterial colonies, such that a plurality of side-by-side scanning tracks are obtained. The array of detectors includes one detector at each end which is sensitive to colonies just outside the strip being scanned. The outputs of the end detectors are not included in the count summation but are used to inhibit counts of adjacent detectors, whereby each colony is counted but once and colonies falling in positions overlapping adjacent scanning tracks are counted only once.

Another feature is the same as the preceding feature wherein the array of photodetectors is scanned in an overlapping spiral track over the pattern of light images focused by the colonies being counted, whereby circular dishes of culture medium are easily and rapidly scanned by spinning the culture medium about its geometric center.

In another feature of the present invention, the bacterial colony counting machine includes means for spinning the culture medium about its geometric center and means for translating the array of photodetectors toward and away from the axis of rotation by means of a pivotable arm pivoting about a second axis of rotation parallel to and displaced from the axis of rotation of the culture medium, whereby the array of photodetectors is caused to traverse a spiral shaped scanning track over the culture medium.

Other features and advantages of the present invention will become apparent upon a perusal of the following specification taken in connection with the accompanying drawings wherein:

DESCRIPTION OF THE PREFERRED EMBODIMENTS

Figure 1:
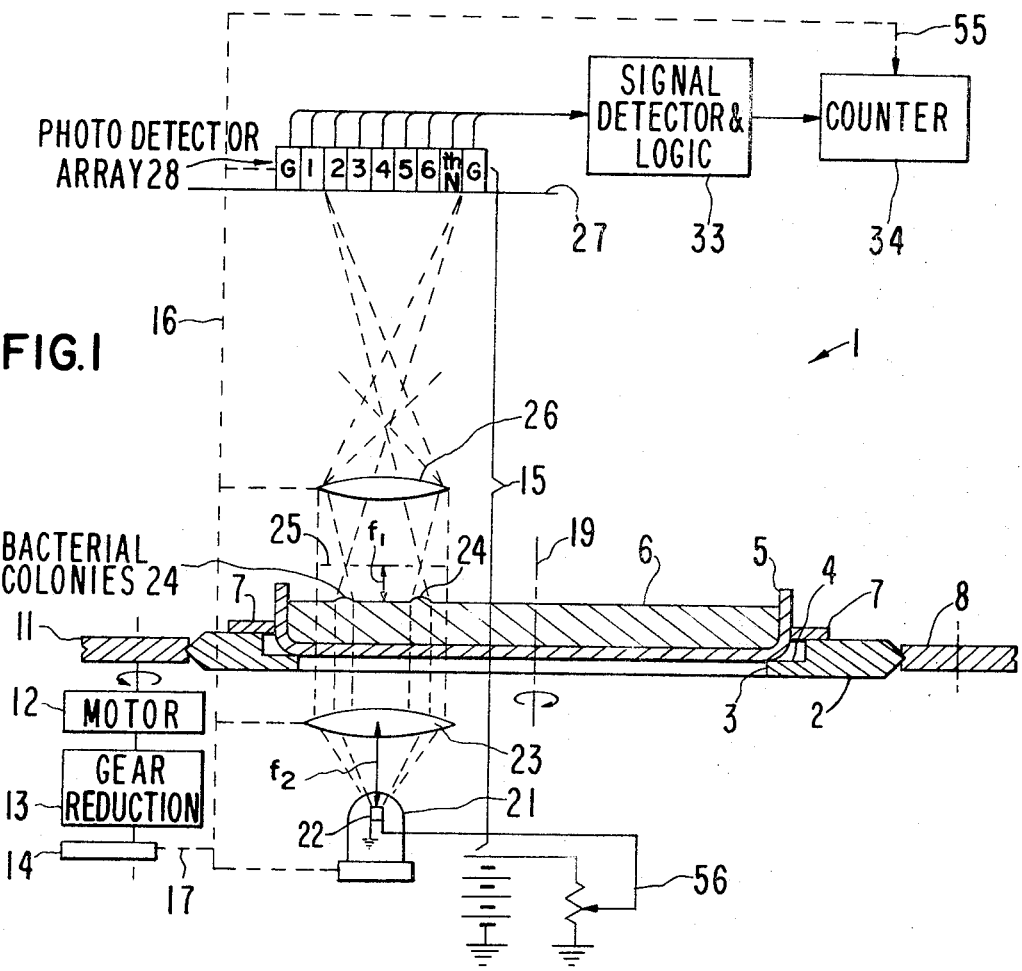
FIG. 1 is a schematic diagram, partly in block diagram form, depicting a bacterial colony counting machine incorporating features of the present invention.
Figure 2:
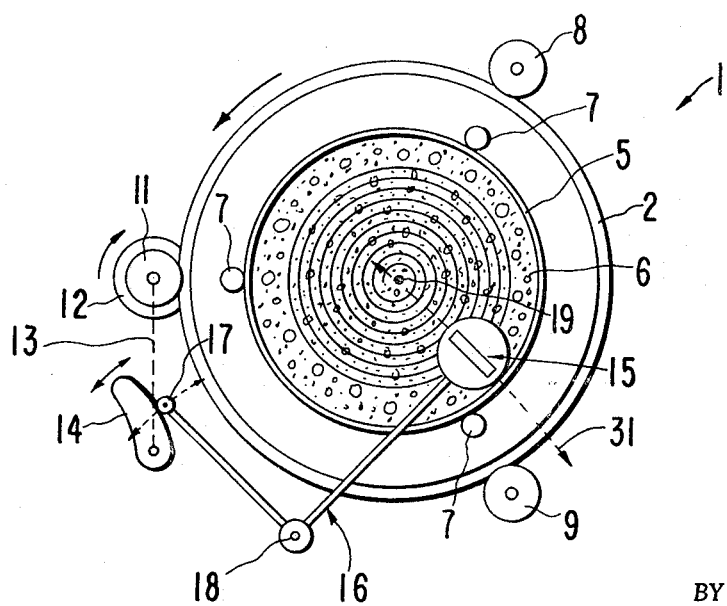
FIG. 2 is a schematic plan view of the apparatus of FIG. 1.

Referring now to FIGS. 1 and 2, there is shown the bacterial colony counting machine 1 incorporating features of the present invention. The machine 1 includes a circular rotating stage 2, as of aluminum having a central aperture 3. A shoulder 4 is provided at the lip of the central aperture 3 for receiving the outer periphery of a petri dish 5 containing a transparent bacterial culture medium 6, as of agar. The petri dish 5 is also transparent. Three dish holding members 7 are carried from the rotating stage 2 at 120° intervals about the shoulder 4 for gripping the petri dish and for holding the petri dish 5 to the rotating stage 2.

Three wheels are positioned about the periphery of the rotating stage 2 at approximately 120° intervals. Two of the wheels 8 and 9 are idler wheels, whereas the third wheel 11 is a drive wheel for frictionally driving the rotating stage 2. A motor 12 is coupled to the drive wheel 11 for driving same and a gear reduction 13 is coupled to the other end of the motor for driving a scanning cam 14 coupled to the output shaft of the gear reduction 13.

An optical system 15 is carried from a pivotable support structure 16. The pivotable support structure 16 is driven from a cam follower 17 riding on the cam surface of cam 14. The pivotable support structure 16 is pivotable about an axis 18 which is parallel to the axis of rotation of the petri dish 5 and spaced from the axis of rotation 19 of the petri dish 5 by a substantial distance such that the optical system 15 is caused to track approximately along a radius of the axis of rotation 19 of the petri dish 5.

The optical system 15 includes a light source 21, such as an incandescent filament 22 of relatively small size as of 2.0 mm by 1.5 mm, to provide a localized source of light (photons). The light emitted from the light source 21 is picked-up by a condensing lens 23 and converted to parallel rays directed through the transparent petri dish 5, bacterial culture medium 6 and bacterial colonies 24 located on the surface of the culture medium 6. The bacterial colonies 24 are generally of a shape approximating a portion of a sphere to form spherical lenses which focus images of the filament 22 onto a primary image plane 25 a few mm above the surface of the medium 6. The size of these source images is approximately the source size multiplied by the ratio of the focal length of the colony lenses $f_1$ (typically 3 to 15 mm) and condensing lens 23, $f_2$. Since the light from the condenser 23 is parallel, the lateral spacing between images formed by different colonies is the same as the spacing between the actual colonies, regardless of their focal length. In a uniform layer of bacteria, destroyed bacteria can form concave craters in the form of negative spherical lenses which focus images of the filament onto an image plane below the surface of the medium.

A projection lens 26, such as a nominal $5x$ microscopic objective lens, is disposed above the primary image plane for focusing a magnified image of the primary pattern of colony formed images in a projected image plane 27 at a distance, as of 30 cm, from the primary image plane 25. Actual magnification is approximately seven times and can be changed by altering the 30 cm projection distance. In the actual embodiment, not shown, the 30 cm light path is folded by a mirror, not shown, to reduce the height of the second image plane 27 above the primary images.

A linear array of 12 photo transistor light detectors 28, such as Fairchild FPM 100 photodetectors, are positioned on 2.0 mm centers and mounted in the plane 27 of the projected image pattern. As the stage 2 rotates, images formed by the colonies 24 cross the array 28 in a direction perpendicular to its long dimension. The array of photodetectors 28 includes a pair of guard detectors, i.e. the detectors at opposite ends of the array form guard detectors, and their pulse outputs are not counted. The central detectors, as of 1 to $n$ where $n = 10$, are sensitive to colonies on a segment of the radius of the petri dish, as of 0.29 cm in length. The 10 central detectors, which span 2.0 cm, are sensitive to colonies on a 0.29 cm wide strip of the agar surface. As the petri dish 5 is rotated the array 28 is simultaneously moved via the pivotable support structure 16 along radial path 31, i.e. radially directed relative to the axis of rotation 19 of the petri dish 5, such that a spiral strip 0.29 cm wide is scanned to cover the total surface of the petri dish 5.

In a typical petri dish 5, having a radius of 4.5 cm, scanning requires approximately 15 rotations of the dish 5 to complete a spiral scan of the entire petri dish. However, use of 15 rotations to complete the scanning reduces the required number of detectors and detector circuits to one-fifteenth (plus two guard detectors) as many required by the prior art method, exemplified by U.S. Pat. No. 3,493,772.

The photodetectors of the array 28 are arranged such that as the detector encounters an increased light intensity in the image pattern and that light intensity increases above a certain threshold value, as determined by a threshold adjustment in the electronic circuit of the detector, the detector emits an output pulse. This pulse is fed through a signal detecting and logic circuit 33 and thence to a counter 34 for summation. The signal and detecting logic circuit 33 is arranged such that a pulse output from a first detector inhibits counting of the output pulses derived from its immediately adjacent neighbor detectors, such that each colony image is counted but once.

Figure 3:
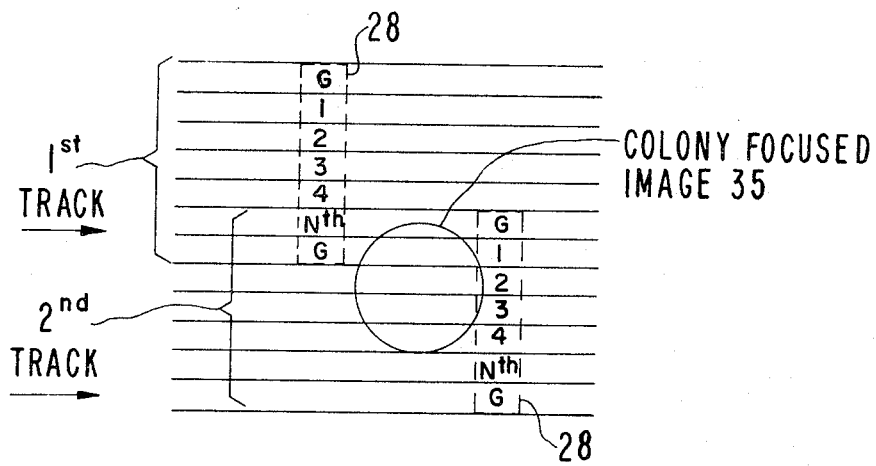
FIG. 3 is a schematic line diagram depicting overlapping scanning tracks over the colony image pattern and depicting the function of the photodetectors for detecting a colony overlapping two adjacent scanning tracks.

The pivotable support structure 16 and cam 14 are dimensioned such that adjacent scanning tracks of the photodetector array 28 overlap each other by the width of the scanning track portion produced by two adjacent photodetectors (see FIG. 3). This overlapping of successive scanning tracks prevents double counting a colony focused image laying on the boundary of two scanning tracks. More particularly, as the lower guard detector G of the array 28 on the first track first encounters the colony image 35 of FIG. 3 the lower guard detector emits an output pulse which inhibits the pulse output of the $n$th detector from being counted. Since the output of the guard detector G is not counted, no count for colony image 35 is obtained on the first scanning track encountering such image. On the second scanning track, which overlaps the first track by the width of the guard detector and one additional detector, the first detector to encounter the colony image 35 such as detector 1 or 2 produces an output pulse which is counted and which also inhibits output pulses from the adjacent channels from being counted. Thus, the colony image 35 is counted only once.

Figure 4:
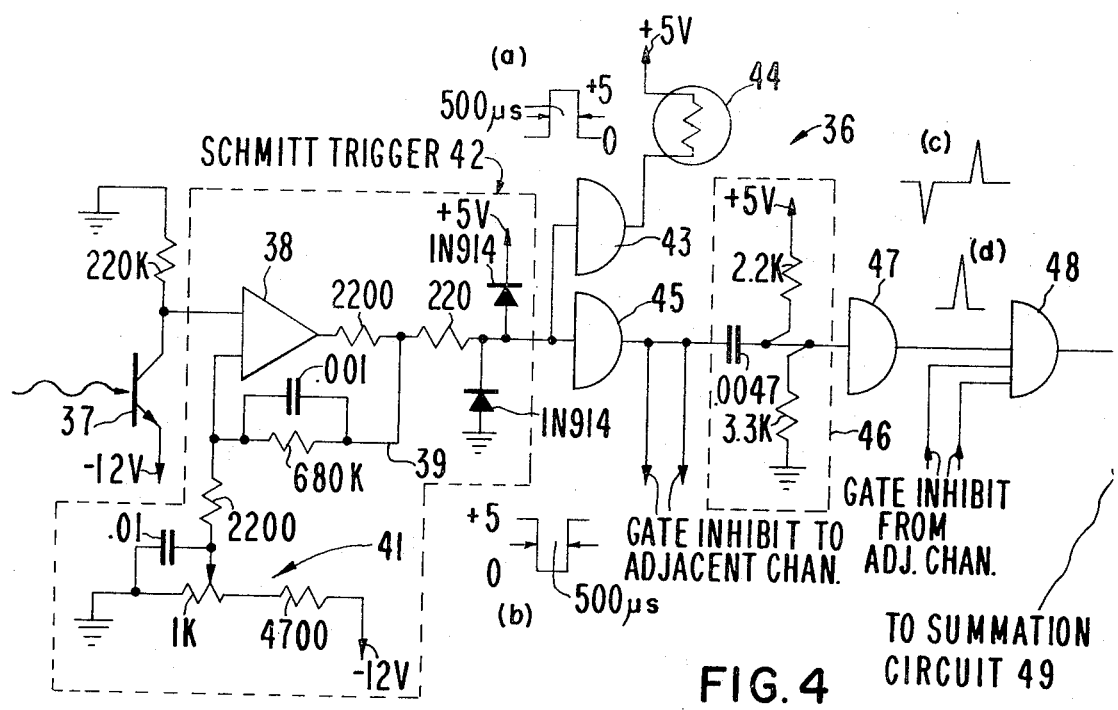
FIG. 4 is a schematic circuit diagram depicting the detection and logic circuit for one active channel of the array of photodetectors and, FIG. 5 is a schematic diagram depicting the pulse summation and counting circuit for counting the outputs of the individual detection and logic channels.

Referring now to FIG. 4, there is shown the signal detection and logic circuit 36 for each of the 1-$n$ active detectors of the array 28. The guard channels are similar to that of FIG. 4 with the exception that the pulse outputs from the guard channels are not fed to the summation circuit for counting. In FIG. 4, a light from the colony focused image is incident upon the input of a photodetector 37 to produce an output electrical signal fed to one input of an operational amplifier 38. The operational amplifier includes a positive feedback channel 39 and a threshold adjust circuit 41 for applying a reference potential to the input of the operational amplifier 38 for comparison with the input derived from the output of the photodetector 37. The operational amplifier will not be triggered until the input from the photodetector 37 achieves a certain threshold level as determined by the threshold adjustment circuit 41.

When the input signal from the photodetector exceeds the threshold level the operational amplifier produces an output pulse and is connected for operation as a Schmitt trigger indicated by a dotted line 42. The output of the Schmitt trigger 42 is a positive voltage pulse as of +5 volts, of a duration approximately equal to the expected duration (width) of the colony images to be counted, as of 500 microseconds. This output pulse is indicated by waveform ($a$).

An output pulse of this Schmitt trigger 42 is fed to an inverter 43 for inversion. The output of inverter 43 is fed to an indicator lamp 44 for showing the condition of the Schmitt trigger. Another output of the Schmitt trigger 42 is fed to a second inverter 45 to produce an output pulse having a waveform as shown by waveform ($b$). These inverted output pulses are fed to gates in adjacent logic channels to inhibit counting of pulses from the adjacent channels.

A sample of the inverted output of the Schmitt trigger 42 is fed to a differentiator 46 for producing a negative output spike at the beginning of the Schmitt trigger pulse and a positive spike at the end of the trigger pulse, as indicated by waveform (c). The output of the differentiator 46 is fed to a third inverter 47 to produce an inverted waveform of that of the waveform (c). The first spike passes through a gate 48 to a summation circuit 49 unless inhibit input signals are applied to gate 48 from the adjacent channels.

Figure 5:
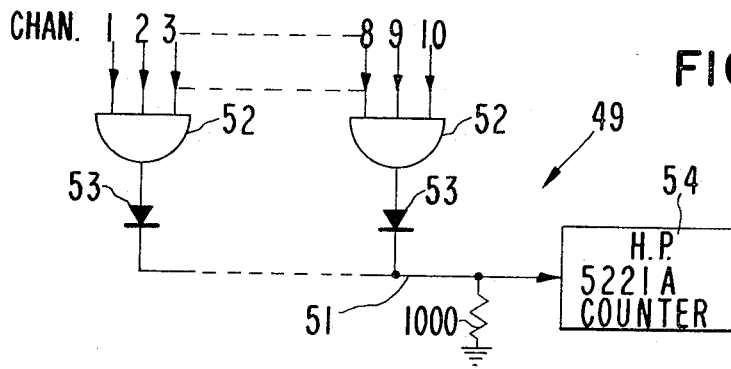

Referring now to FIG. 5, there is shown the pulse summation and counting circuit 49. The outputs from all of the gates 48 corresponding to the different channels to be counted are gated onto the common line 51 via the intermidiary of gates 52 and diodes 53. Individual pulses, as fed onto the common line 51, have an amplitude of approximately 5 volts and a pulse width of approximately 5 micro-seconds. An electronic counter 54 is connected to the output of the common line 51 for counting the pulses to derive a count of the bacterial colonies.

In operation, the petri dish 5 having the bacterial colonies or bacterial craters formed by destroyed bacteria thereon, is placed on the rotatable stage 2. Scanning starts at a point outside of the edge of the petri dish 5. The lip 3 of the rotating stage 2 blocks light transmission until the axis of the optical system is just inside the edge of the dish 5 so that light is not refracted on the rim of the dish 5. As the optical axis crosses the stage center, a snap action switch, indicated by dotted line 55, is actuated which stops further counting in the counter 54. After crossing center, the cam 14 returns the optical system to its starting point with the optical axis just outside of the edge of the dish 5. The counter 54 is zeroed and restarted with a manual switch before scanning of a new dish 5 begins.

The scanning rate is adjustable by varying the speed of the motor 12. Reliable counting is obtained at stage rotation speeds up to about 90 rpm (1.5 rpms). The corresponding total scanning time is approximately 10 seconds.

Two operator adjustments are provided. The first is a source light intensity adjustment 56 for adjusting the threshold image intensity which will be detected. Setting the threshold adjustment 56 to too low a value results in missing small colonies or colonies that produce out-of-focus images, while too high a setting increases the counts due to artifacts and irregularities in the agar. The second adjustment is provided to accommodate colonies having different focal lengths and to compensate for different thicknesses of the agar medium. The adjustment is made by positioning the petri dish so that a typical colony 24 focuses light on a screen in the plane of the photodetector array 28. Focus control is then set for minimum image size and maximum intensity.

The machine 1 of the present invention is capable of counting thousands of colonies on a single petri dish 5 in 10 seconds with accuracies of a few percent.

What is claimed is:

1. A counter for counting bacterial colonies comprising the combination:
    light source means for illuminating the bacterial colonies;
    a side-by-side array of photodetector means responsive to the illumination for detecting the bacteria colonies and generating an electric signal corresponding to each bacteria colony detected;
    scanning means for systematically moving the side-by-side array relative to the bacterial colonies causing the photodetector means to scan the bacterial colonies a portion at a time through a plurality of adjacent overlapping scanning tracks;
    counting means for counting the electrical signals from the photodetector means; and
    guard photodetector means mounted on the opposite ends of the side-by-side array, the counting means being unresponsive to the guard photodetector means, and the adjacent scanning tracks overlapping each other by about the track width of one of the guard photodetectors plus the track width of the photodetector adjacent thereto whereby bacterial colonies overlapping adjacent scanning tracks are counted only once.

2. The counter of claim 1 wherein the relative motion between the side-by-side array of photodetector and the bacterial colonies is a symetrical spiral of overlapping scanning tracks.

3. The counter of claim 2 wherein the scanning means rotates the bacterial colonies about an axis of rotation and establishes relative translation motion between the bacterial colonies and the side-by-side array generally along a path which traverses the bacterial colonies.

4. The counter of claim 3 wherein the side-by-side array of photodetector means are mounted on a support arm pivotable about an axis of rotation generally parallel to and spaced from the axis of rotation of the bacterial colonies.

5. The counter of claim 2 wherein the counting means include inhibiting means for inhibiting counting of the output pulses of the photodetector means adjacent to the photo-detector means first delivering an output pulse in response to a bacteria colony whereby double counting of the same bacteria colony is prevented.

6. In a method for counting bacterial colonies on the surface of or in the body of a culture medium, comprising the steps of:
    illuminating the culture medium with photons derived from a localized source, the photons responsive to the light refracting properties of the colonies to create a pattern of individual images of the light source in a region beyond the culture medium there being one image corresponding to each bacterial colony;
    scanning the image pattern with a side-by-side array of photon detecting means along a plurality of adjacent scanning tracks which overlap by the width of two detectors at one end of the side-by-side array;
    generating an electric pulse each time the photon detecting means detect a light source image;
    counting the pulses;
    blocking the counting of the pulses of adjacent photon detectors in response to light source images overlapping adjacent photon detectors whereby only one count is obtained per image; and
    blocking the counting of the photon detectors on the opposite ends of the side-by-side array whereby preventing double counting of images which overlap the adjacent scanning tracks.

7. The method of claim 6 wherein the scanning step comprises scanning the image pattern with an overlapping spiral scanning track.

* * * * *